United States Patent
Johno et al.

(10) Patent No.: US 8,754,918 B2
(45) Date of Patent: Jun. 17, 2014

(54) OPTICAL SCANNER AND IMAGE FORMING APPARATUS INCLUDING SAME

(75) Inventors: Hiroshi Johno, Kanagawa (JP); Takeshi Yamakawa, Kanagawa (JP); Keiichi Serizawa, Kanagawa (JP); Kazunori Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 15 days.

(21) Appl. No.: 13/157,256

(22) Filed: Jun. 9, 2011

(65) Prior Publication Data
US 2011/0316958 A1    Dec. 29, 2011

(30) Foreign Application Priority Data
Jun. 23, 2010    (JP) .................................. 2010-142285

(51) Int. Cl.
*B41J 15/14*    (2006.01)
*B41J 27/00*    (2006.01)

(52) U.S. Cl.
USPC ............................. 347/242; 347/257; 347/263

(58) Field of Classification Search
USPC ........................... 347/230, 241–244, 256–261
See application file for complete search history.

(56) References Cited

U.S. PATENT DOCUMENTS

| | | | | |
|---|---|---|---|---|
| 6,466,246 | B2 * | 10/2002 | Fujimoto | 347/243 |
| 6,933,959 | B2 * | 8/2005 | Kojima et al. | 347/257 |
| 7,256,813 | B2 * | 8/2007 | Serizawa et al. | 347/245 |
| 7,589,879 | B2 * | 9/2009 | Kondoh et al. | 359/209.1 |
| 7,663,656 | B2 * | 2/2010 | Yamazaki | 347/242 |
| 7,782,352 | B2 * | 8/2010 | Ohsugi | 347/242 |
| 7,800,804 | B2 * | 9/2010 | Ohsugi | 359/196.1 |
| 8,027,075 | B2 * | 9/2011 | Serizawa | 359/206.1 |
| 2008/0218828 | A1 | 9/2008 | Serizawa | |
| 2010/0033787 | A1 | 2/2010 | Serizawa et al. | |

FOREIGN PATENT DOCUMENTS

| | | | | |
|---|---|---|---|---|
| JP | 05-196884 | A | 8/1993 | |
| JP | 07-084203 | A | 3/1995 | |
| JP | 07225348 | A * | 8/1995 | G02B 26/10 |
| JP | 09-159955 | A | 6/1997 | |
| JP | 11-160644 | A | 6/1999 | |
| JP | 11218718 | A * | 8/1999 | G02B 26/10 |
| JP | 2004-192010 | A | 7/2004 | |
| JP | 2006-035570 | A | 2/2006 | |
| JP | 2006-028651 | A | 8/2007 | |
| JP | 2009-198888 | A | 9/2009 | |
| JP | 2010-026470 | A | 2/2010 | |

OTHER PUBLICATIONS

Japanese Office Action dated Sep. 13, 2013 for corresponding Japanese Application No. 2010-142285.

* cited by examiner

*Primary Examiner* — Hai C Pham
(74) *Attorney, Agent, or Firm* — Harness, Dickey & Pierce (57) ABSTRACT

An optical scanner includes a housing, a light source, a polygon mirror, an optical device, and a holder. The housing includes a mounting portion. The light source projects light. The polygon mirror is enclosed within the housing and rotates to deflect the light projected from the light source. The optical device is disposed substantially near the polygon mirror. The holder is disposed within the housing and attached to the housing at the mounting portion, and holds the optical device in place. A distance L1 between a center of rotation of the polygon mirror and the optical device is shorter than a distance L2 between the center of rotation of the polygon mirror and the mounting portion. An image forming apparatus includes the optical scanner.

20 Claims, 10 Drawing Sheets

CENTER OF
ROTATION OF
POLYGON MIRROR

FIG. 9B

CENTER OF
ROTATION OF
POLYGON MIRROR

OPTICAL SCANNER AND IMAGE FORMING APPARATUS INCLUDING SAME

CROSS-REFERENCE TO RELATED APPLICATIONS

This patent application is based on and claims priority pursuant to 35 U.S.C. §119 from Japanese Patent Application No. 2010-142285, filed on Jun. 23, 2010 in the Japan Patent Office, which is hereby incorporated herein by reference in its entirety.

FIELD OF THE INVENTION

Exemplary aspects of the present invention generally relate to an image forming apparatus, such as a copier, a facsimile machine, a printer, or a multi-functional system including a combination thereof, and more particularly, to an optical scanner and an image forming apparatus including same.

BACKGROUND OF THE INVENTION

Related-art image forming apparatuses, such as copiers, facsimile machines, printers, or multifunction printers having at least one of copying, printing, scanning, and facsimile functions, typically form an image on a recording medium according to image data. Thus, for example, a charger uniformly charges a surface of an image bearing member; an optical scanner projects a light beam onto the charged surface of the image bearing member (i.e. photoconductive drum) to form an electrostatic latent image on the image bearing member according to the image data; a developing device supplies toner to the electrostatic latent image formed on the image bearing member to make the electrostatic latent image visible as a toner image; a transfer device transfers the toner image directly from the image bearing member onto a recording medium or indirectly from the image bearing member onto a recording medium via an intermediate transfer member; a cleaning device then cleans the surface of the image carrier after the toner image is transferred from the image carrier onto the recording medium; finally, a fixing device applies heat and pressure to the recording medium bearing the unfixed toner image to fix the unfixed toner image on the recording medium, thus forming the image on the recording medium.

Generally, the optical scanner is equipped with a rotary polygon mirror (hereinafter referred to as a polygon mirror) and optical devices such as an imaging lens. The polygon mirror and the optical devices are directly attached to a housing of the optical scanner. The optical devices are disposed near the polygon mirror. Such a known optical scanner forms the electrostatic latent image on the photoconductive drum serving as a latent image bearing member by deflecting and scanning the light using the polygon mirror. The imaging lens focuses the light onto the photoconductive drum.

During image formation, the polygon mirror rotates fast, generating heat from a shaft bearing of the polygon mirror. As a result, an area of the housing near the polygon mirror deforms due to thermal expansion, which results also in deformation of the housing to which the optical devices are attached, changing the orientation of the optical devices near the polygon mirror. A change in the orientation of optical devices causes an increase in spot diameter of the deflected light beams, thereby degrading imaging quality.

In the case of a tandem-type color image forming apparatus in which a plurality of photoconductive drums for different colors is arranged in tandem, a change in the orientation of the optical devices shifts a position of projection of light against the surfaces of photoconductive drums for different colors to a sub-scanning direction (a surface moving direction of the photoconductive drum), resulting in color drift.

To address such difficulty, in one approach, a surface of the housing of the optical scanner opposite the polygon mirror includes a hole, and the area of the housing near the polygon mirror thermally expands so as to fill the hole. In other words, the hole permits thermal expansion of the housing, thereby suppressing deformation of the housing near the polygon mirror and hence reducing changes in the orientation of the optical devices near the polygon mirror.

Although advantageous, while the hole can help reducing deformation of the housing due to thermal expansion, the fact that the housing itself deforms due to thermal expansion still remains. In other words, providing a hole is not enough to prevent deformation of the housing and changes in the orientation of the optical devices near the polygon mirror.

SUMMARY OF THE INVENTION

In view of the foregoing, in one illustrative embodiment of the present invention, an optical scanner includes a housing, a light source, a polygon mirror, a first optical device, and a holder. The housing includes a mounting portion. The light source projects light. The polygon mirror is enclosed within the housing and rotates to deflect the light projected from the light source. The first optical device is disposed substantially near the polygon mirror. The holder is disposed within the housing and attached to the housing at the mounting portion, and holds the optical device in place. A distance L1 between a center of rotation of the polygon mirror and the optical device is shorter than a distance L2 between the center of rotation of the polygon mirror and the mounting portion.

In another illustrative embodiment of the present invention, an image forming apparatus includes the optical scanner.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF ILLUSTRATIVE EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Figure 1:
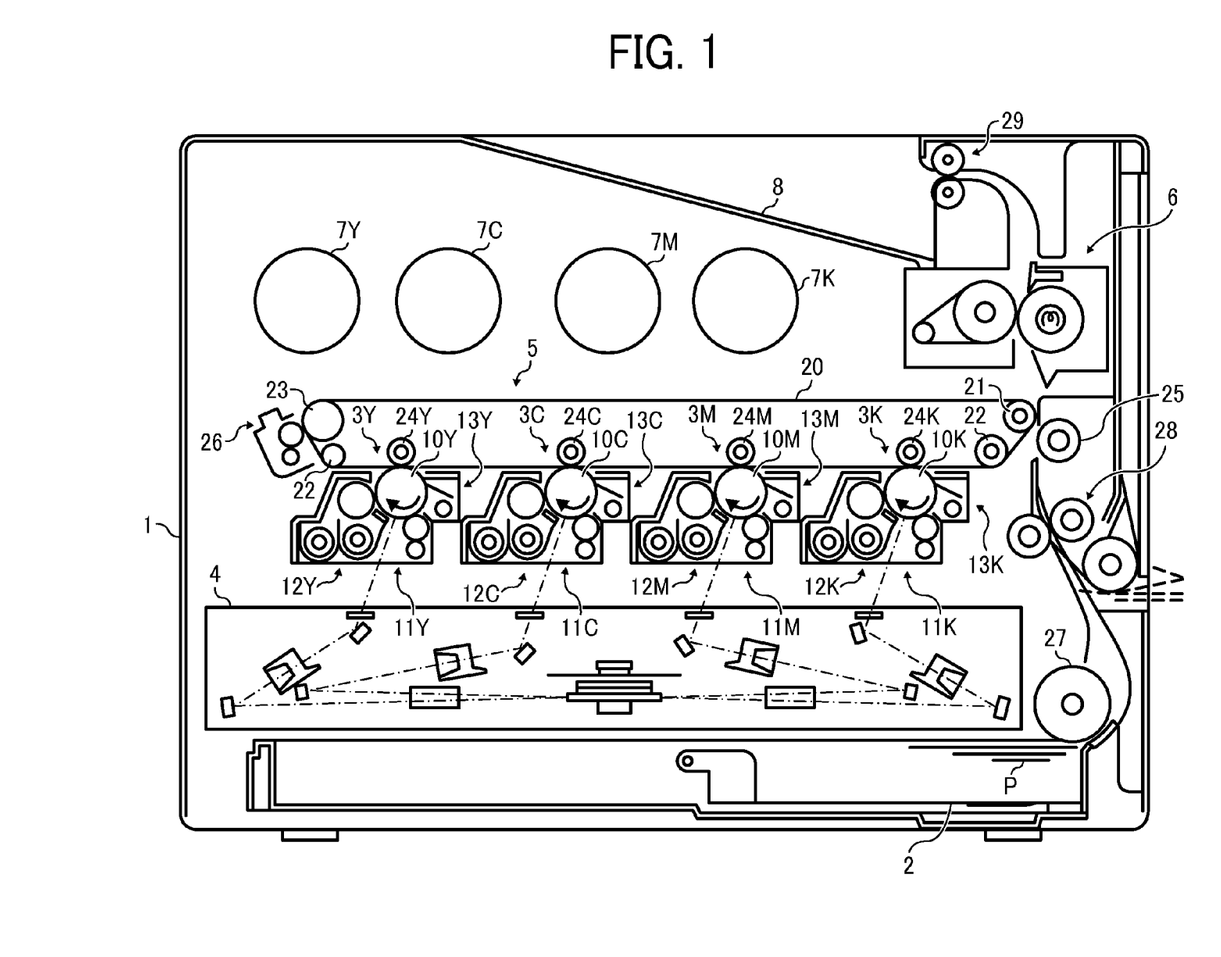
FIG. 1 is a schematic diagram illustrating a printer as an example of an image forming apparatus according to an illustrative embodiment of the present invention.

Referring now to the drawings, wherein like reference numerals designate identical or corresponding parts throughout the several views, and initially to FIG. 1, one example of an image forming apparatus according to an illustrative embodiment of the present invention is described.

With reference to FIG. 1, a description is provided of an electrophotographic color laser printer as an example of an image forming apparatus according to the illustrative embodiment of the present invention. FIG. 1 is a schematic diagram illustrating the image forming apparatus according to an illustrative embodiment of the present invention.

The image forming apparatus includes a housing 1, a sheet cassette 2, image forming stations 3Y, 3C, 3M, and 3K, an optical writing unit 4 serving as an optical scanner, an intermediate transfer unit 5, a fixing device 6, toner bottles 7Y, 7C, 7M, and 7K, and so forth. The sheet cassette 2 is detachable from the housing 1. It is to be noted that reference characters Y, C, M, and K denote colors yellow, cyan, magenta, and black, respectively. To simplify the description, the reference characters Y, M, C, and K indicating colors are omitted herein unless otherwise specified.

The image forming stations 3Y, 3C, 3M, and 3K are disposed substantially at the center of the housing 1. The image forming stations 3Y, 3C, 3M, and 3K, one for each of the colors yellow (Y), cyan (C), magenta (M), and black (K), form toner images, also known as visible images, of yellow, cyan, magenta, and black, respectively.

Figure 2:
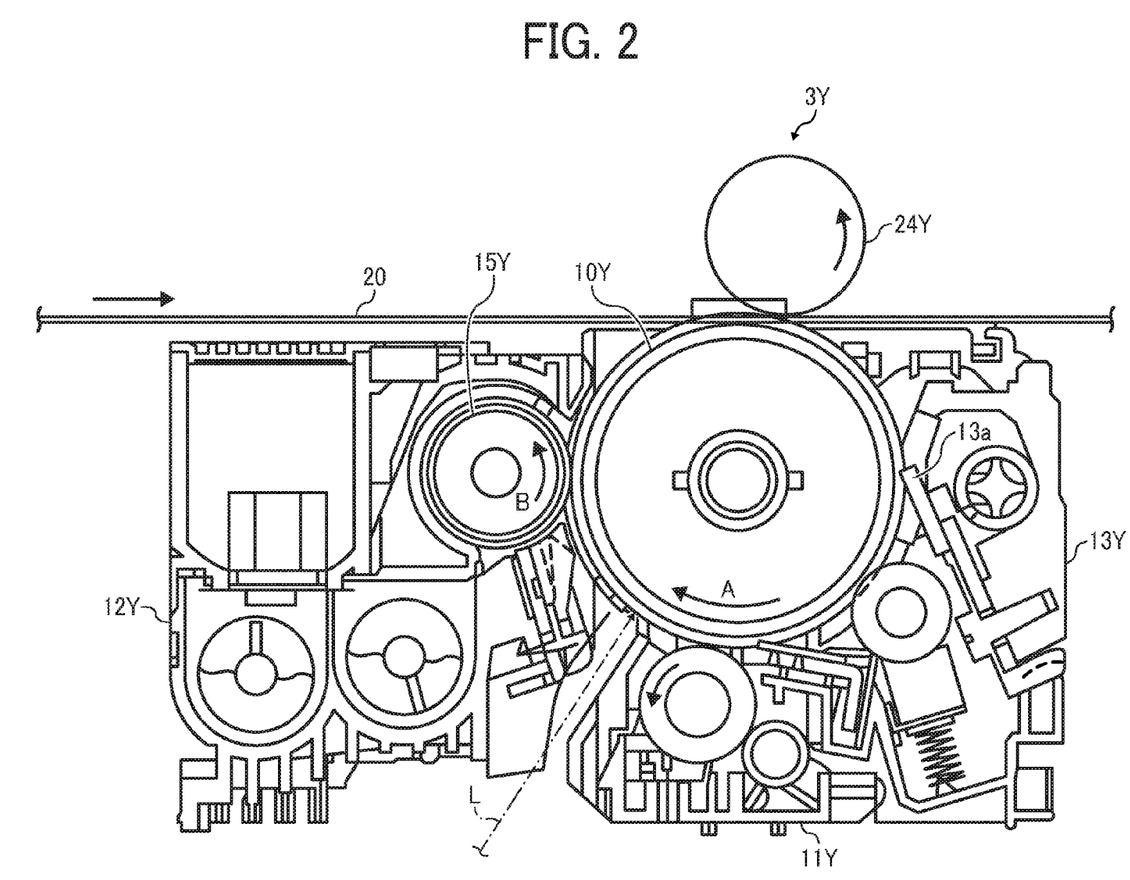
FIG. 2 is a schematic enlarged view of an image forming station for yellow as an example of image forming stations in the image forming apparatus of FIG. 1.

With reference to FIG. 2, a description is provided of one of the image forming stations 3Y, 3C, 3M, and 3K. FIG. 2 is an enlarged schematic diagram illustrating the image forming station 3Y for yellow. It is to be noted that the image forming stations 3Y, 3C, 3M, and 3K all have the same configuration as all the others, differing only in the color of toner employed. Thus, a description is provided of the image forming station 3Y as an example of the image forming station.

As illustrated in FIGS. 1 and 2, the image forming stations 3Y, 3C, 3M, and 3K include photoconductive drums 10Y, 10C, 10M, and 10K serving as latent image bearing members that rotate in a direction indicated by an arrow A. The photoconductive drums 10Y, 10C, 10M, and 10K, one for each of the colors yellow, cyan, magenta, and black, are arranged facing the intermediate transfer belt 20, and the toner images of the respective color are formed on the photoconductive drums 10Y, 10C, 10M, and 10K. The photoconductive drums 10Y, 10C, 10M, and 10K are formed of an aluminum cylinder base having a diameter approximately 40 mm covered with a photosensitive layer, for example, an organic photoconductor (OPC) layer.

The image forming stations 3Y, 3C, 3M, and 3K include charging devices 11Y, 1C, 11M, and 11K, each disposed around the photoconductive drums 10Y, 10C, 10M, and 10K, to charge the photoconductive drums 10Y, 10C, 10M, and 10K.

Developing devices 12Y, 12C, 12M, and 12K, and cleaning devices 13Y, 13C, 13M, and 13K are also disposed near the respective photoconductive drums 10Y, 10C, 10M, and 10K. The developing devices 12Y, 12C, 12M, and 12K develop latent images formed on the photoconductive drums 10Y, 10C, 10M, and 10K with toner. The cleaning devices 13Y, 13C, 13M, and 13K remove residual toner remaining on the photoconductive drums 10Y, 10C, 10M, and 10K.

The optical writing unit 4 serving as an optical scanner is disposed substantially below the image forming stations 3Y, 3C, 3M, and 3K. The optical writing unit 4 projects a writing light beam L against the photoconductive drums 10Y, 10C, 10M, and 10K to optically scan the photoconductive drums 10.

The intermediate transfer unit 5 is disposed substantially above the image forming stations 3Y, 3C, 3M, and 3K. The intermediate transfer unit 5 includes an intermediate transfer belt 20 wound around a plurality of rollers and formed into a loop. The toner images formed in the image forming stations 3Y, 3C, 3M, and 3K are transferred onto the intermediate transfer belt 20.

The fixing device 6 fixes the toner image transferred on the intermediate transfer belt 20 to a transfer medium such as a recording medium P.

The toner bottles 7Y, 7C, 7M, and 7K storing toner of yellow, cyan, magenta, and black, respectively, are disposed at an upper portion of the housing 1. The toner bottles 7Y, 7C, 7M, and 7K are detachable from the housing 1 by opening a sheet discharge tray 8 provided at the upper portion of the housing 1.

The optical writing unit 4 includes a laser diode serving as a light source. The laser diode projects the writing light beam L against a polygon mirror of a polygon scanner 50 (shown in FIG. 3). The polygon mirror includes a plurality of mirror surfaces that rotates, and is in the shape of a regular polygonal prism. The writing light beam L is deflected in a main scanning direction by the mirror surfaces of the polygon mirror 50 while rotating.

Subsequently, the writing light beam L reflected by the plurality of mirrors scans the photoconductive drums 10Y, 10C, 10M, and 10B which have been charged uniformly by the charging devices 11Y, 11C, 11M, and 11K. Accordingly, electrostatic latent images of yellow, cyan, magenta, and black are formed on the surfaces of the photoconductive drums 10Y, 10C, 10M, and 10B, respectively.

The intermediate transfer belt 20 of the intermediate transfer unit 5 serving as a transfer mechanism is formed into a loop and is wound around a drive roller 21, a tension roller 22, and a driven roller 23 and rotates in a counterclockwise direction in FIG. 1 at a predetermined speed.

The fixing device 5 includes primary transfer rollers 24Y, 24C, 24M, and 24K, a secondary transfer roller 25, a belt cleaning device 26, and so forth. The primary transfer rollers 24Y, 24C, 24M, 24K to primarily transfer the toner images formed on the photoconductive drums 10Y, 10C, 10M, and 10B onto the intermediate transfer belt 20 so that they are superimposed one atop the other, thereby forming a composite color toner image on the intermediate transfer belt 20.

The secondary transfer roller 25 transfers the composite toner image primarily transferred onto the intermediate transfer belt 20 to the recording medium P. The belt cleaning device 26 removes the residual toner remaining on the intermediate transfer belt 20 after the transfer process.

Next, a description is provided of a color image forming process according to the illustrative embodiment of the present invention.

In the image forming stations 3Y, 3C, 3M, and 3K, the photoconductive drums 10Y 10C, 10M, and 10K are uniformly charged by the charging devices 11Y, 11C, 11M, and 11K. Subsequently, based on image information, the photoconductive drums 10Y 10C, 10M, and 10K are scanned by the writing light beam L, thereby forming electrostatic latent images thereon. The electrostatic latent images are developed with toner of respective colors borne on developing rollers 15, thereby forming toner images of yellow, cyan, magenta, and black on the photoconductive drums 10Y 10C, 10M, and 10K.

The primary transfer rollers 24Y, 24C, 24M, and 24K transfer primarily the toner images of yellow, cyan, magenta, and black from the photoconductive drums 10Y, 10C, 10M, and 10K onto the intermediate transfer belt 20 rotating in the counterclockwise direction so that they are superimposed one atop the other, thereby forming a composite color toner image.

The toner images are transferred from the photoconductive drums 10Y, 10C, 10M, and 10K onto the intermediate transfer belt 20 at different timing from the upstream to the downstream in the belt moving direction such that the toner images are transferred at the same position on the intermediate transfer belt 20.

After the primary transfer, a cleaning blade 13a (shown in FIG. 2) provided to the cleaning devices 13Y, 13C, 13M, and 13K cleans the surface of the photoconductive drums 10Y through 10K in preparation for the subsequent imaging cycle.

The toner in the toner bottles 7Y, 7C, 7M, and 7K is supplied to the developing devices 12Y, 12C, 12M, and 12K of the image forming stations 3Y, 3C, 3M, and 3K as necessary.

The recording medium P in the sheet cassette 2 is sent to a sheet conveyance path in the housing 1 by a sheet feed roller 27 disposed substantially near the sheet cassette 2. The recording medium P is temporarily stopped at a pair of registration pallets 28, and is sent to a secondary transfer nip defined by the secondary transfer roller 25 and the intermediate transfer belt 20 at predetermined timing.

In the secondary transfer nip, the toner image formed on the intermediate transfer belt 20 is transferred onto the recording medium P.

As the recording medium P bearing the toner image passes through the fixing device 6, the toner image is fixed onto the recording medium P. After fixing the toner image on the recording medium P, the recording medium P is discharged onto the sheet discharge tray 8 by a sheet discharge roller 29.

Similar to the photoconductive drum 10, the residual toner remaining on the intermediate transfer belt 20 is removed by the belt cleaning device 26 contacting the intermediate transfer belt 20.

Figure 3:
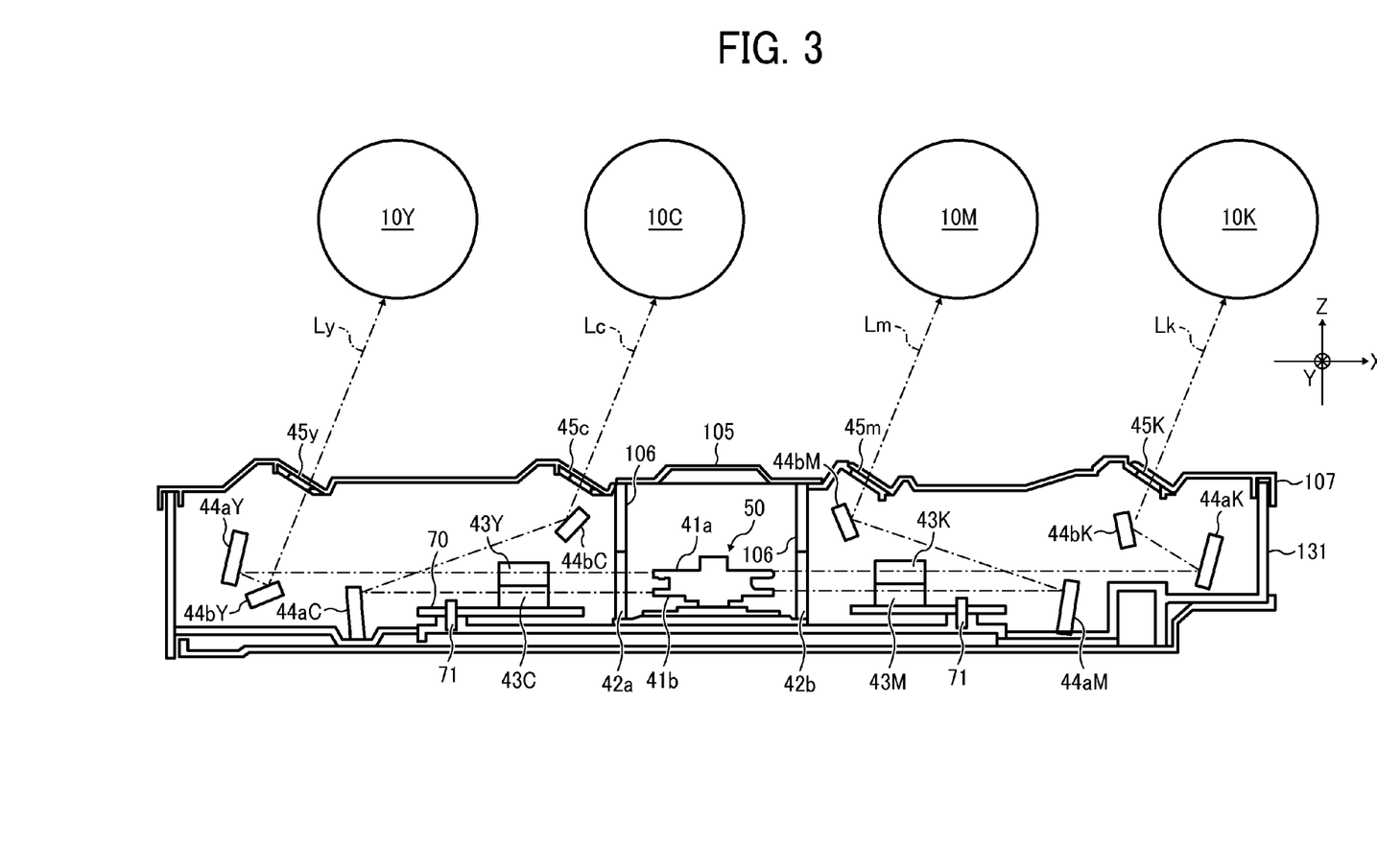
FIG. 3 is a schematic diagram illustrating an optical writing unit employed in the image forming apparatus according to an illustrative embodiment of the present invention.
Figure 4:
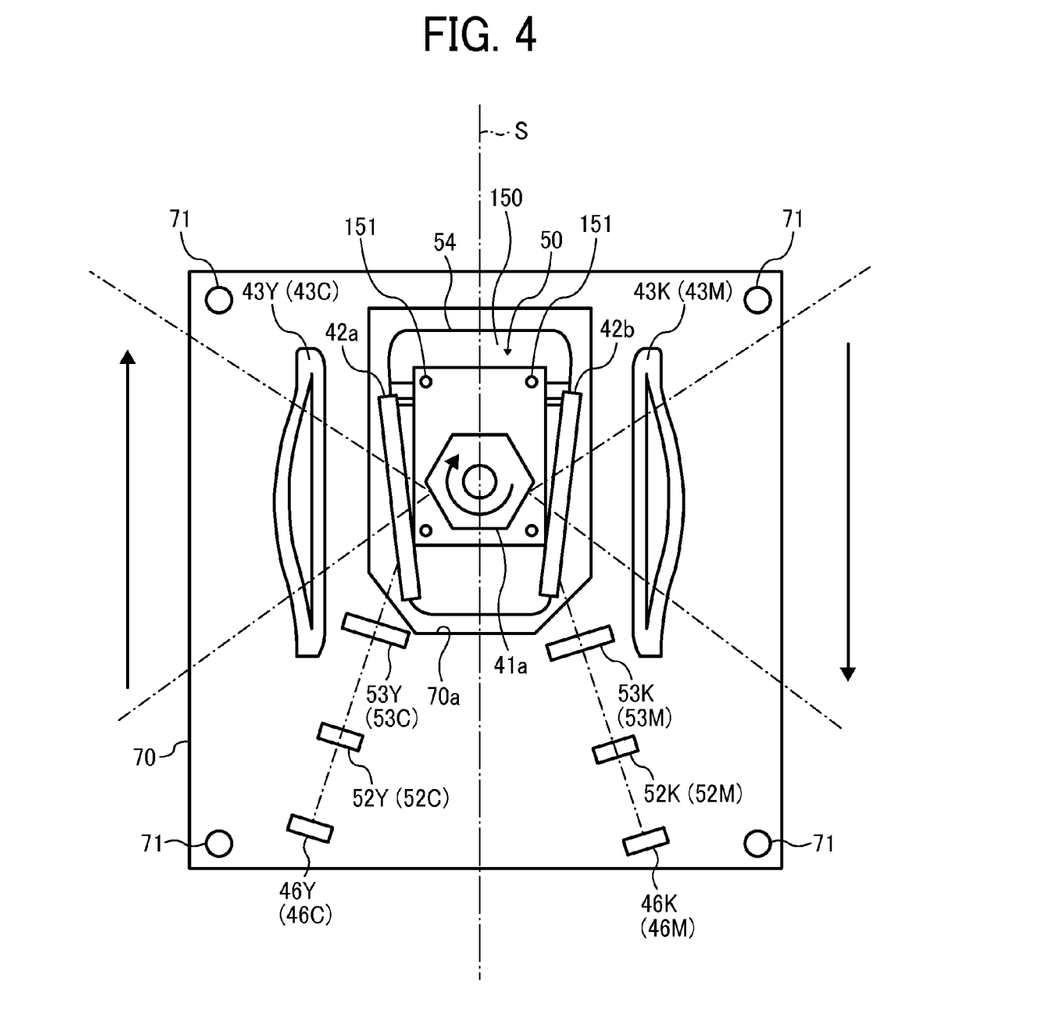
FIG. 4 is a top view of the optical writing unit of FIG. 3.
Figure 5:
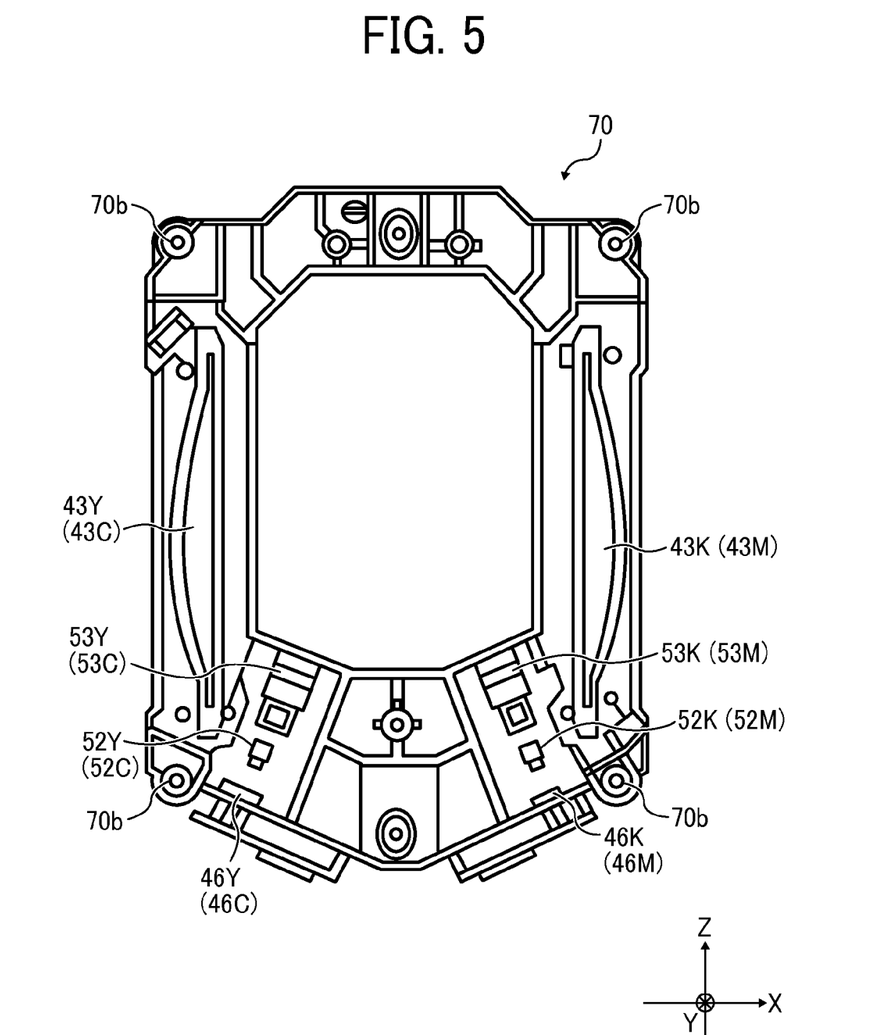
FIG. 5 is a top view of a holder employed in the optical writing unit according to an illustrative embodiment of the present invention.

With reference to FIGS. 3 through 5, a description is provided of the optical writing unit 4 according to the illustrative embodiment of the present invention.

FIG. 3 is a schematic diagram illustrating the optical writing unit 4 according to the illustrative embodiment of the present invention. FIG. 4 is a top view of the optical writing unit 4 of FIG. 3. FIG. 5 is a top view of a holder 70 employed in the optical writing unit 4.

The optical writing unit 4 serving as an optical scanner includes optical devices such as a polygon scanner 50, reflective mirrors, lenses, and so forth. The polygon scanner 50, the optical devices such as the reflective mirrors, the lenses, and so forth, are stored in a housing 131 of the optical writing unit 4. The housing 131 includes an opening at the upper portion thereof. A cover 107 covers the opening of the housing 131. The cover 107 includes dustproof glasses 45Y, 45C, 45M, and 45K. As illustrated in FIG. 4, the polygon scanner 50 is disposed substantially at the center of the optical writing unit 4 and surrounded by soundproof glasses 42a and 42b, and a soundproof wall 54 serving as a rib. According to the illustrative embodiment, the soundproof glasses 42a and 42b and the soundproof wall 54 constitute a sound insulating wall.

As illustrated FIG. 3, the cover 107 includes an opening at the center thereof. Inner walls 106 serving also as ribs are provided in the housing 131 such that the ribs 106 extend from the opening of the cover 107 towards the polygon scanner side. More specifically, the bottom end of the ribs 106 contacts the upper end of the soundproof glasses 42a and 42b, as well as the upper surface of the soundproof wall 54. A deflector cover 105 is provided to cover the opening of the cover 107. With this configuration, the polygon scanner 50 is sealed by the soundproof glasses 42a and 42b, the soundproof wall 54, the ribs 106, and the deflector cover 105.

As illustrated in FIG. 4, the polygon scanner 50 includes two concentric rotary polygon mirrors 41a and 41b (the latter shown in FIG. 3) in the shape of a regular polygonal prism, a polygon motor (not shown), and a circuit board 150. The circuit board 150 includes electronic parts to control operation of the polygon motor. Each of the polygon mirrors 41a and 41b has six sides consisting of reflective mirrors. The polygon scanner 50 is fixed to the housing 131 within the area surrounded by the soundproof glasses 42a and 42b, and the soundproof wall 54 by a screw.

As illustrated in FIG. 5, the holder 70 holds the optical devices disposed near the polygon scanner 50, such as scan lenses 43Y, 43M, 43C, and 43K serving as optical elements, laser diodes 46Y, 46M, 46C, and 46K serving as light sources, collimating lenses 52Y, 52M, 52C, and 52K, and cylindrical lenses 53Y, 53C, 53M, and 53K. The laser diode 46K for color black is disposed above the laser diode 46M for magenta. The laser diode 46Y for yellow is disposed above the laser diode 46C for cyan.

The optical devices for black (the scan lens 43K, the collimating lens 52K, and the cylindrical lens 53K) are disposed above the optical devices for magenta. The optical devices for yellow (the scan lens 43Y, the collimating lens 52Y, and the cylindrical lens 53Y) are disposed above the optical devices for cyan.

Figure 6:
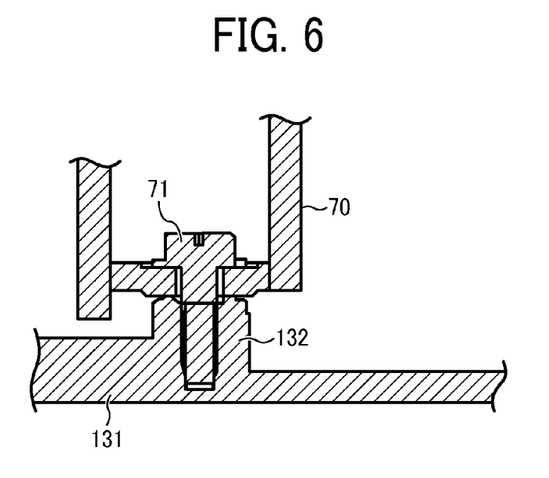
FIG. 6 is an enlarged cross-sectional view of a through-hole of the holder of FIG. 5 according to an illustrative embodiment of the present invention.

As illustrated in FIG. 5, through-holes 70b are formed at four corners of the holder 70. Screws 71 are each inserted into the holes 70b as illustrated in FIG. 6. FIG. 6 is an enlarged cross-sectional view of one of through-holes 70b into which the screw 71 is inserted.

As illustrated in FIGS. 3 and 4, an optical system for color magenta and black including the optical devices for magenta and black are disposed at the right side of the polygon scanner 50 from a symmetry line S. An optical system for color yellow and cyan including the optical devices for yellow and cyan are disposed at the left side of the polygon scanner 50. In the optical writing unit 4, the optical devices and the laser diodes serving as light sources are disposed symmetrically about a line S through the center of rotation of the polygon mirrors 41a and 41b, perpendicular to a rotation axis of the polygon mirrors 41a and 41b.

More specifically, the scan lenses 43Y, 43M, 43C, and 43K, the laser diodes 46Y, 46M, 46C, and 46K, the collimating lenses 52Y, 52M, 52C, and 52K, and the cylindrical lenses 53Y, 53C, 53M, and 53K are disposed symmetrically with respect to the line S. The collimating lenses 52Y, 52M, 52C, and 52K, and the cylindrical lenses 53Y, 53C, 53M, and 53K serve as pre-deflection optical systems disposed on the light path between the laser diodes 46 and the polygon mirror 50, to adjust the cross-sectional shape of the light beam.

Writing light beams Ly, Lc, Lm, and Lk projected from the laser diodes 46Y, 46M, 46C, and 46K, respectively, are collimated into parallel light fluxes by the collimating lenses 52Y, 52M, 52C, and 52K. After passing through the cylindrical lenses 53Y, 53C, 53M, and 53K, the collimated light fluxes are focused in the sub-scanning direction (the surface moving direction of the photoconductive drum 10 on the photoconductive drum 10).

Subsequently, the light fluxes are reflected by the mirror surfaces of the polygon mirrors 41a and 41b rotated at high speed by the polygon motor, thereby deflecting the light fluxes in the main scanning direction, which corresponds to the axial direction on the surface of the photoconductive drum 10. The moving speed of the light fluxes deflected in the main scanning direction at a constant angular velocity by the polygon mirrors 41a and 41b is converted into a constant speed by the scan lenses 43Y, 43M, 43C, and 43K, while the light fluxes are focused in the sub-scanning direction, and a face tangle error of the mirror surfaces of the polygon mirrors 41a and 41b is corrected.

The writing light beams Ly, Lc, Lm, and Lk transmitted through the scan lenses 43Y, 43C, 43M, and 43K are directed towards the respective reflective mirrors. For example, as illustrated in FIG. 3, the writing light beam Ly for color yellow transmitted through the scan lens 43Y is reflected by a first reflective mirror 44aY and a second reflective mirror 44bY, thereby being directed to the surface of the photoconductive drum 10Y. Similar to the writing light beam Ly, the writing light beams Lc, Lm, and Lk are reflected by first reflective mirrors 44aC, 44aM, and 44aK, and second reflective mirrors 44bC, 44bM, and 44bK, thereby being directed to the surfaces of the photoconductive drums 10C, 10M, and 10K. The writing light beams Ly, Lc, Lm, and Lk reflected by the second reflective mirrors 44bY, 44bC, 44bM, and 44bK pass through the dustproof glasses 45Y, 45C, 45M, and 45K of the cover 107, and then arrive at the photoconductive drums 10Y, 10C, 10M, and 10K.

Rotation of the polygon mirrors 41a and 41b at high speed generates heat at a shaft bearing, not illustrated, of the rotary shaft of the polygon mirrors 41a and 41b. The heat permeates the bottom surface of the housing 131 immediately below the shaft bearing, thereby heating the housing 131 near the polygon mirrors. As a result, the housing 131 near the polygon mirrors thermally expands and deforms.

Conventionally, laser diodes and optical devices such as collimating lens, cylindrical lenses, and scan lenses are attached directly to the housing of the optical scanner. In this case, the mounting portion of the housing when the optical devices and the laser diodes are attached deforms due to thermal expansion of the housing. As a result, an orientation of the optical devices and the laser diodes changes undesirably, causing undesirable shift in the scan position relative to the photoconductive drums. In particular, if the optical scanner is a counter-scanning type optical scanner, when the orientation of the optical devices and the light sources changes, color drift becomes significant.

Figure 7A:
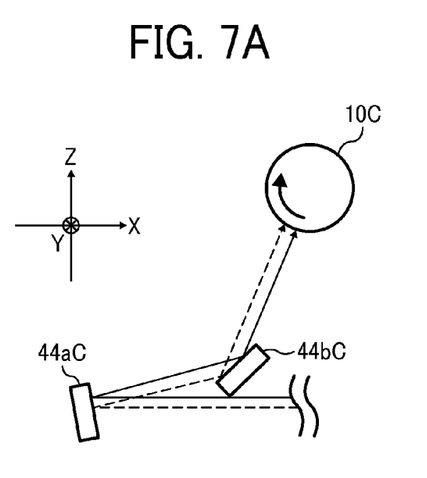
FIG. 7A is a schematic diagram illustrating a shift in a scan position for cyan caused by a change in orientation of an optical device and a light source.
Figure 7B:
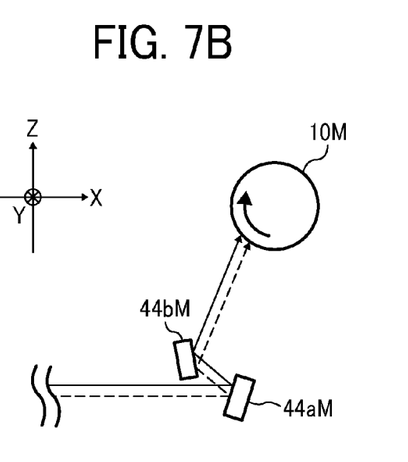
FIG. 7B is a schematic diagram illustrating a shift in a scan position for magenta caused by a change in the orientation of the optical device and the light source.

In order to facilitate an understanding of the related art and of the novel features of the present invention, with reference to FIGS. 7A and 7B, a description is now provided of a shift in the scan position for color cyan caused by a change in the orientation of the optical devices and the light sources due to thermal deformation of the housing as described above. FIG. 7A is a schematic diagram illustrating a shift in the scan position of color cyan. FIG. 7B is a schematic diagram illustrating a shift in the scan position of color magenta. In FIGS. 7A and 7B, a solid line represents a scan line before deformation of the housing 131, and a broken line represents a scan line after deformation of the housing 131.

FIG. 7A illustrates the writing light beam shifting downward due to a change in the orientation of the optical devices and the light sources. As illustrated in FIG. 7A, the scan position relative to the photoconductive drum 10C disposed at one side (at the left side in FIG. 3) relative to the polygon mirrors 41a and 41b shifts downward in the direction of movement of the photoconductive drum 10C as compared with the scan position before deformation of the housing 131, that is, before the orientation of the optical devices and the light sources changes.

Similar to cyan, the scan position relative to the photoconductive drum 10Y disposed at one side (at the left side in FIG. 3) from the polygon mirrors 41a and 41b shifts downward in the direction of move of the photoconductive drum 10Y.

By contrast, as illustrated in FIG. 7B, the scan position relative to the photoconductive drum 10M disposed at the other side (at the right side in FIG. 3) relative to the polygon mirrors 41a and 41b shifts upward in the direction of move of the photoconductive drum 10M as compared with the scan position before deformation of the housing 131, that is, before the orientation of the optical devices and the light sources changes.

Similar to magenta, the scan position relative to the photoconductive drum 10K disposed at the other side (at the right side in FIG. 3) from the polygon mirrors 41a and 41b shifts upward in the direction of move of the photoconductive drum 10K as compared with the scan position before deformation of the housing 131.

As a result, after deformation of the housing 131, the position of images for magenta and black to be formed on the photoconductive drums 10M and 10K disposed opposite the photoconductive drums 10C and 10Y via the polygon mirrors 41a and 41b shifts significantly relative to the images for cyan and yellow to be formed on the photoconductive drums 10C and 10Y. Hence, in the counter-scanning type optical scanner, the color drift becomes significant when the orientation of the optical devices and the light sources changes.

In view of the above, according to the illustrative embodiment, the light sources (the laser diodes 46Y, 46M, 46C, and 46K) and the optical devices (the collimating lenses 52Y, 52M, 52C, and 52K, the cylindrical lenses 53Y, 53M, 53C, and 53K, and the scan lenses 43Y, 43M, 43C, and 43K) disposed near the polygon mirrors are attached to the holder 70 in such a way as to reduce, if not prevent entirely, the change in the orientation of the light sources and the optical devices.

Figure 8A:
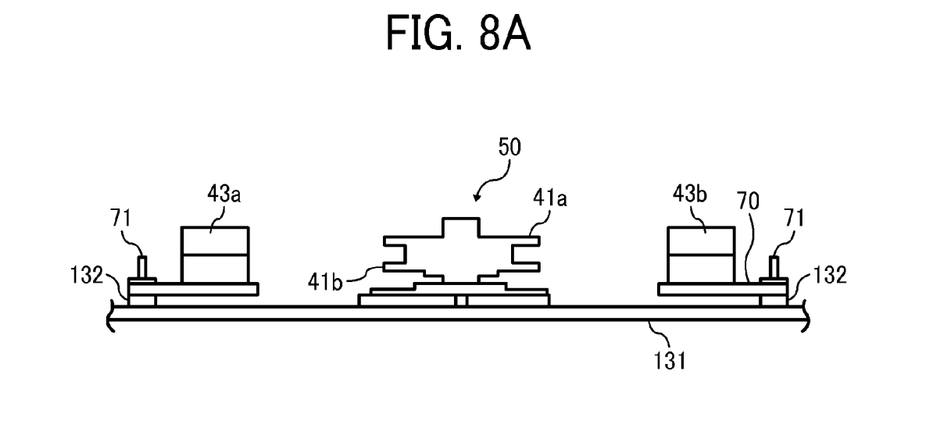
FIG. 8A is a partially enlarged schematic diagram illustrating a polygon scanner and optical devices near the polygon scanner before thermal deformation of the housing.
Figure 8B:
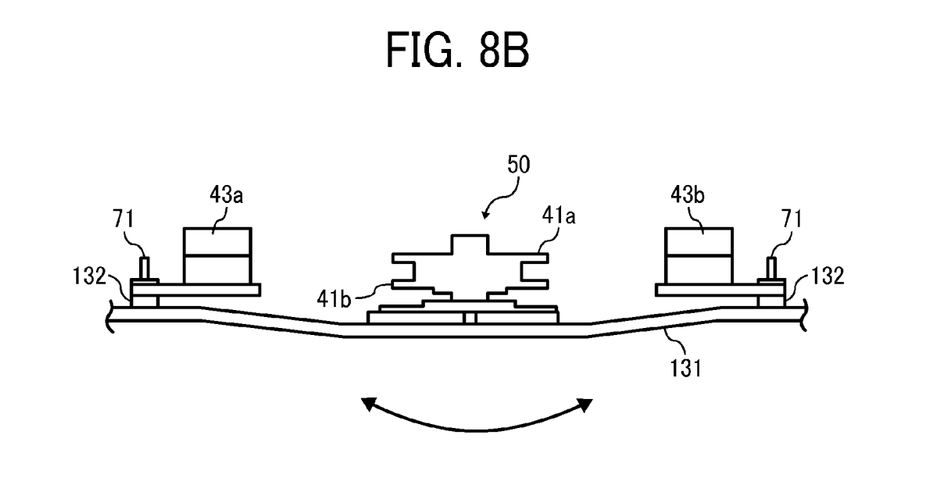
FIG. 8B is a partially enlarged schematic diagram illustrating the polygon scanner and the optical devices near the polygon scanner after thermal deformation of the housing.

As illustrated in FIGS. 4 and 5, the distance between an attachment position of the holder 70 attached to the housing 131 and the polygon mirrors 41a and 41b is greater than the distance between the position of the optical devices and the light sources, and the polygon mirrors 41a and 41b. With this configuration, as illustrated in FIGS. 8A and 8B, even when the area of the housing 131 near the polygon mirrors 41a and 41b deforms undesirably due to heat, the portion of the housing 131 to which the holder 70 is attached does not deform, thereby preventing a change in the orientation of the holder 70. FIG. 8A is a partially enlarged schematic diagram illustrating the polygon scanner 50 and the optical devices near the polygon scanner 50 before thermal deformation of the housing 131. FIG. 8B is a partially enlarged schematic diagram illustrating the polygon scanner 50 and the optical devices near the polygon scanner 50 after thermal deformation of the housing 131.

Accordingly, the orientation of the optical devices (the collimating lenses 52Y, 52M, 52C, and 52K, the cylindrical lenses 53Y, 53M, 53C, and 53K, and the scan lenses 43Y, 43M, 43C, and 43K), and the light sources (the laser diodes 46Y, 46M, 46C, and 46K) held by the holder 70 do not change, hence preventing color drift.

As illustrated in FIG. 6, the holder 70 contacts the housing 131 only at a holder mounting portion 132. The holder 70 is spaced apart a certain distance from the housing 131. Accordingly, heat is prevented from being transmitted from the housing 131 to the holder 70, thus preventing the temperature of the holder 70 from rising and thereby preventing thermal deformation of the holder 70 itself.

Figure 9A:
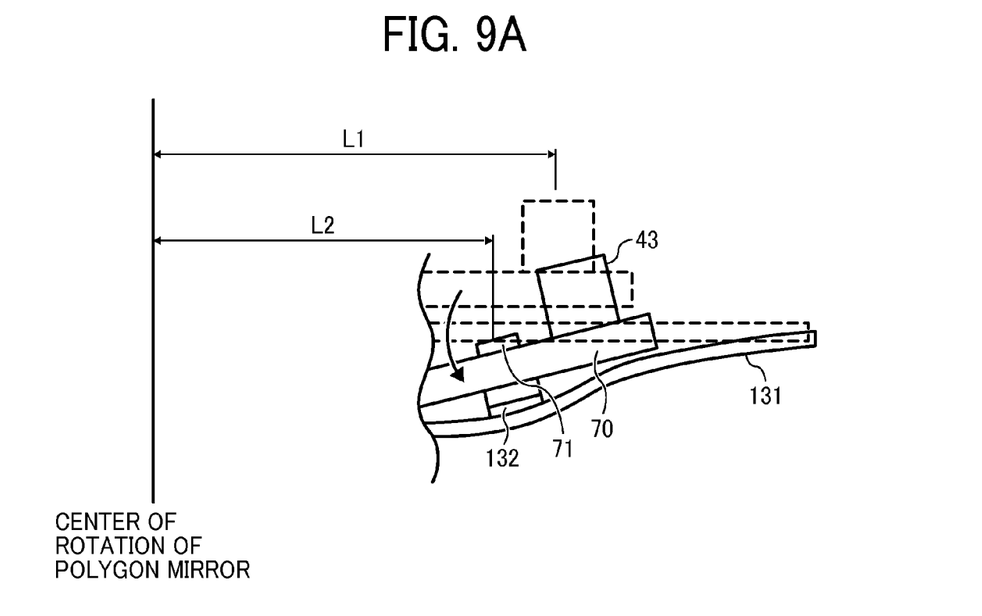
FIG. 9A is a schematic diagram illustrating a change in the orientation of the optical devices when the polygon scanner is closer to an attachment position of the holder attached to the housing than to the optical devices.
Figure 9B:
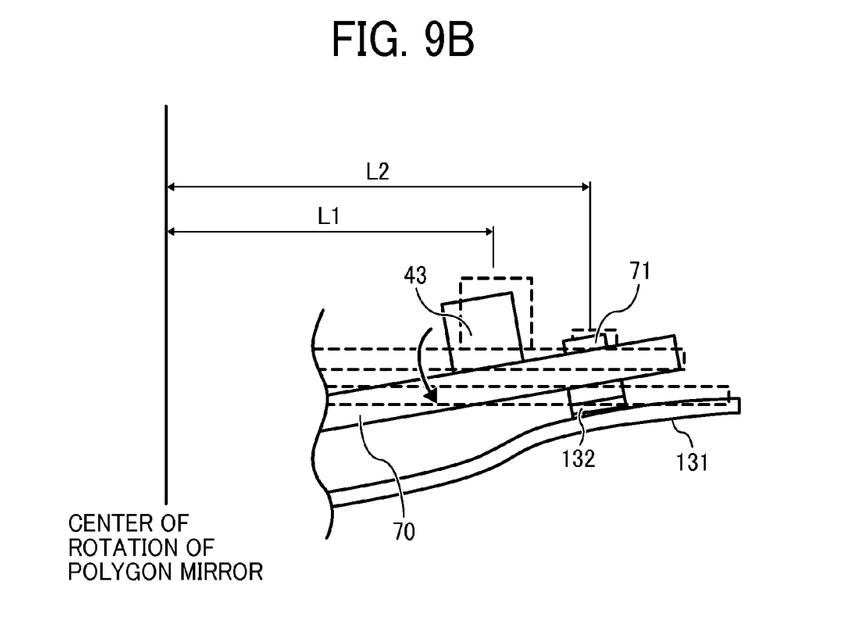
FIG. 9B is a schematic diagram illustrating a change in the orientation of the optical devices when the polygon scanner is closer to the position of the optical devices than to the attachment position of the holder on the housing.

Referring now to FIGS. 9A and 9B, a description is provided of a relation between the mounting position of the holder 70 on the housing 131 and a change in the orientation of the optical devices. FIG. 9A is a schematic diagram illustrating a change in the orientation of the optical devices when the polygon mirrors 41a and 41b are closer to the attachment position of the holder 70 attached to the housing 131 than to the optical devices. FIG. 9B is a schematic diagram illustrating a change in the orientation of the optical devices when the polygon mirrors 41a and 41b are closer to the optical devices on the holder 70 than to the attachment position of the holder 70 attached to the housing 131.

A distance L1 from the position of the optical devices on the holder 70 to the center of rotation of the polygon mirrors 41a and 41b needs to be shorter than a distance L2 from the attachment position of the holder 70 on the housing 131 which corresponds to the position of the through-holes 70b.

As illustrated in FIG. 9A, when the distance L1 is longer than the distance L2, the polygon mirrors 41a and 41b are closer to the attachment position of the holder 70 attached to the housing 131 than to the position of the optical devices, in this case, the scan lens 43, for example. As a result, the orientation of the holder 70 changes significantly, thus changing the orientation of the optical devices held by the holder 70.

Furthermore, because the attachment position of the holder 70 is close to the polygon mirrors 41a and 41b, the holder 70 is affected significantly by thermal deformation of the housing 131 due to heat. Consequently, the change in the orientation of the optical devices (i.e. the scan lens 43) is greater than when the optical devices are directly attached to the housing 131.

By contrast, as illustrated in FIG. 9B, when the distance L1 is shorter than the distance L2, the polygon mirrors 41a and 41b are farther from the attachment position of the holder 70 on the housing 131 than from the mounting position of the optical devices, in this case, the scan lens 43, for example. With this configuration, the change in the orientation of the optical devices (i.e. the scan lens 43) due to thermal deformation of the housing 131 is reduced, if not prevented entirely, when compared with the optical devices attached directly to the housing 131.

In addition, according to the illustrative embodiment, by enclosing the polygon scanner 50 with the soundproof glasses 42a and 42b, and the soundproof wall 54, airflow generated by rotation of the polygon mirrors 41a and 41b is blocked. Accordingly, the airflow heated by the polygon scanner 50 is prevented from contacting the optical devices (i.e. the scan lenses 43Y, 43M, 43C, and 43K, and the cylindrical lenses 53Y, 53M, 53C, and 53K) disposed near the polygon scanner 50, thereby preventing the optical devices from getting heated and hence deformed. The scan position and the beam spot diameter are prevented from changing.

The temperature of the polygon scanner and its surroundings may rise by blocking the airflow with the soundproof glasses 42a and 42b, and the soundproof wall 54 so that the housing 131 near the polygon scanner 50 may deform undesirably. However, according to the illustrative embodiment, since the optical devices disposed near the polygon scanner 50 are held by the holder 70, the orientation of the optical devices does not change significantly despite thermal deformation of the housing 131 near the polygon scanner 50.

Furthermore, as described above, the holder 70 also holds the light sources such as the laser diodes 46Y, 46M, 46C, and 46K. With this configuration, the relative positions of the laser diodes, the collimating lens, the cylindrical lenses, and the scan lenses does not change.

Figure 10:
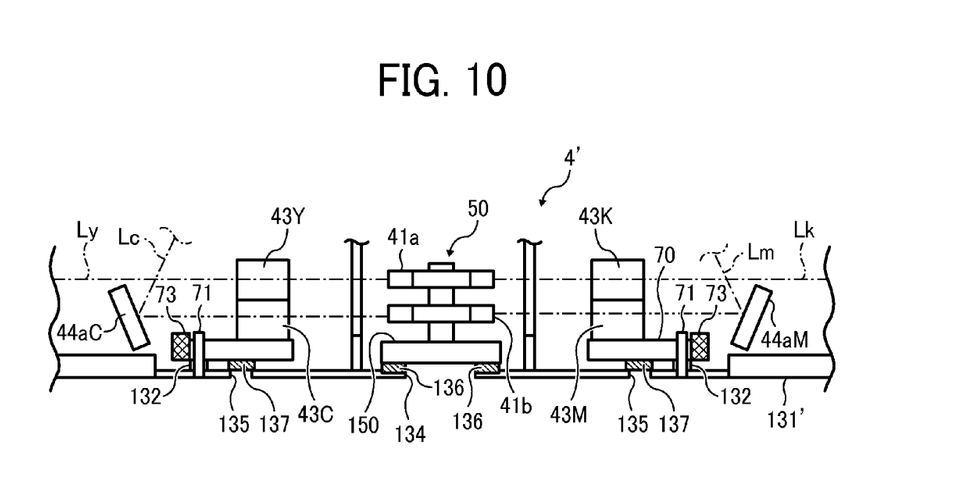
FIG. 10 is a partially enlarged schematic diagram illustrating an optical scanner according to another illustrative embodiment of the present invention.

With reference to FIG. 10, a description is provided of an optical writing unit according to another illustrative embodiment of the present invention. FIG. 10 is a partially enlarged schematic diagram illustrating the optical writing unit according to another illustrative embodiment of the present invention.

The housing 131' of an optical writing unit 4' includes a first hole 134 and a second hole 135. The first hole 134 is provided opposite the polygon scanner 50. The second hole 135 is provided such that the polygon scanner 50 is closer to the second hole 135 than to the holder mounting portion 132. A damping member 73 is provided to the end portion of the holder 70, to suppress vibration of the holder 70.

The first hole 134 in the housing 131 permits thermal expansion of the housing 131 near the polygon scanner 50. More particularly, the housing 131 near the polygon scanner 50 expands and fills the first hole 134. In this configuration, the first hole 134 permits thermal expansion of the housing 131, thereby preventing deformation of the housing 131 and hence preventing deformation of the housing 131 near the holder mounting area. Accordingly, the change in the orientation of the holder 70 is reliably prevented.

Furthermore, the circuit board 150 of the polygon scanner 50 and the shaft bearing, not illustrated, can contact fresh air through the hole 134, thereby getting cooled. Accordingly, the temperature of the housing 131 around the polygon scanner 50 is prevented from rising, thereby suppressing thermal deformation of the housing 131.

The second hole 135 prevents the housing 131 around the holder mounting portion 132 from thermally deforming as the housing 131 around the polygon mirror deforms.

When the housing 131 around the polygon mirror rises or depresses due to thermal deformation, a pulling force acts on the housing 131 around the holder mounting portion 132, causing deformation of the housing 131. However, according to the present embodiment, the second hole 135 prevents the housing 131 around the holder mounting portion 132 from getting pulled when the housing 131 around the polygon mirror rises or depresses. Accordingly, deformation of the housing 131 around the holder mounting portion 132 is suppressed, and the orientation of the holder 70 is prevented from changing, thereby reliably maintaining the orientation of the optical devices.

Foreign substance such as dust may enter from the first hole 134 and the second hole 135, contaminating the optical devices. To address this problem, a first dustproof member 136 and a second dustproof member 137 are provided to the housing 131, to block the foreign substance.

The first dustproof member 136 is disposed around the first hole 134 to block foreign substance from the first hole 134. The bottom surface of the first dustproof member 136 contacts the housing 131, and the upper surface thereof contacts the circuit board 150 of the polygon scanner 50. The first hole 134 is sealed by the circuit board 150 of the polygon scanner 50 and the first dustproof member 136, thereby preventing foreign substance from entering from the first hole 134.

The first dustproof member 136 is formed of an elastic member such as rubber and sponge. The circuit board 150 is disposed on the housing 131 with the compressed first dustproof member 136 disposed therebetween. Accordingly, the first dustproof member 136 is deformed to the shape of the bottom surface of the circuit board 150 and the housing 131, enabling the first dustproof member 136 to contact tightly the circuit board 150 and the housing 131. The foreign substance from the first hole 134 is reliably blocked.

The second dustproof member 137 seals the second hole 135 to prevent dust or the like from entering from the second hole 135. The second dustproof member 137 is preferably made of soft material such as sponge. If the second dustproof member 137 is made of stiff material and the housing 131 at the polygon scanner side farther from the second hole 135 deforms, the second dustproof member 137 cannot deform to the shape of the housing 137. As a result, the second dustproof member 137 undesirably pushes up or down the housing 131 near the holder mounting portion 132, thereby deforming the housing 131 near the holder mounting portion 132. Therefore, the dustproof member 137 is preferably made of soft material so that the dustproof member 137 can deform to the shape of the housing 131.

Furthermore, as illustrated in FIG. 4, the holder 70 is attached to the housing 131 at four places far from the polygon scanner 50 so as to distribute evenly the weight of the holder 70, thereby preventing bending of the holder 70 due to the weight of the optical devices. However, the holder 70 around the polygon scanner 50 is not supported. For this reason, the holder 70 vibrates easily when the housing 131 is vibrated by an external vibration. As the holder 70 vibrates, the optical devices held by the holder 70 vibrate undesirably. Such vibrations may show up as banding in an image and degradation of imaging quality.

In view of the above, the damping member 73 is provided to the holder 70 in the optical writing unit 4', to suppress the vibration of the holder 70. Accordingly, the holder 70 is prevented from vibrating due to the external vibration transmitted to the housing 131, hence preventing banding and degradation of imaging quality.

According to the foregoing embodiments, the present invention is applied to a counter-scanning type optical writing unit that scans four photoconductive drums. The present invention is not limited to this. The present invention may be applied to an optical writing unit that scans a single photoconductive drum.

Figure 11:
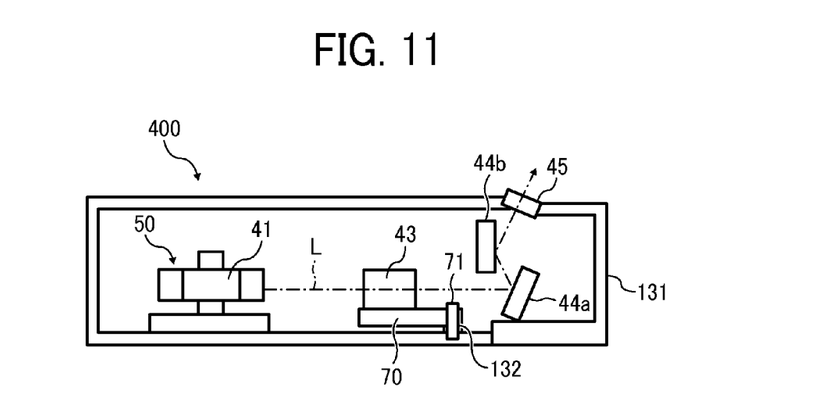
FIG. 11 is a schematic diagram illustrating a single-color optical scanner.
Figure 12:
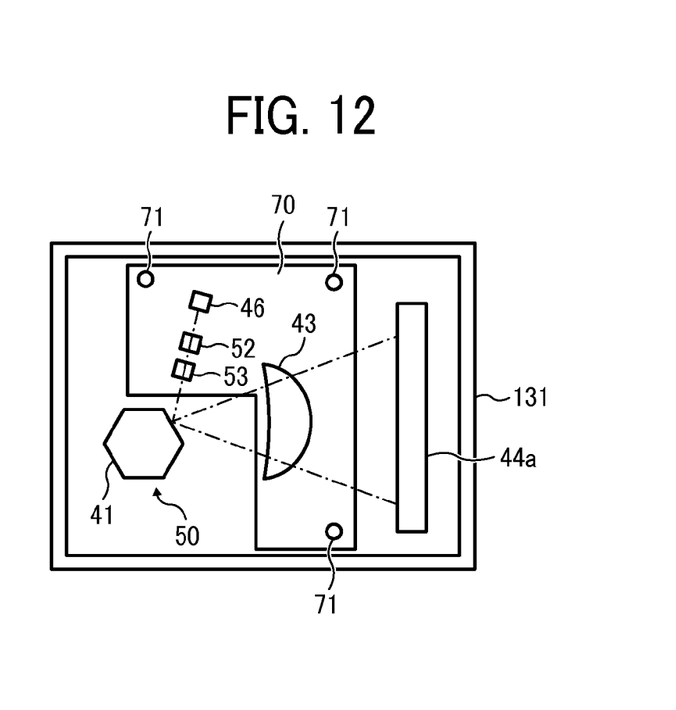
FIG. 12 is a top view of the optical scanner of FIG. 11.

With reference to FIGS. 11 and 12, a description is provided of still another illustrative embodiment of the present invention. FIG. 11 is a schematic diagram illustrating a single-color optical writing unit 400 for scanning one photoconductive drum. FIG. 12 is a top view of the optical writing unit 400.

According to the present embodiment, the single-color optical writing unit 400 includes the holder 70 that holds the optical devices (the scan lens 43, the collimating lens 52, and the cylindrical lens 53) and the light source 46. The housing 70 is attached to the housing 131 such that the distance between the attachment position of the housing 70 attached to the housing 131 and the polygon scanner 50 is greater than the distance between the position of the optical devices and the light sources 46, and the polygon scanner 50.

Figure 13:
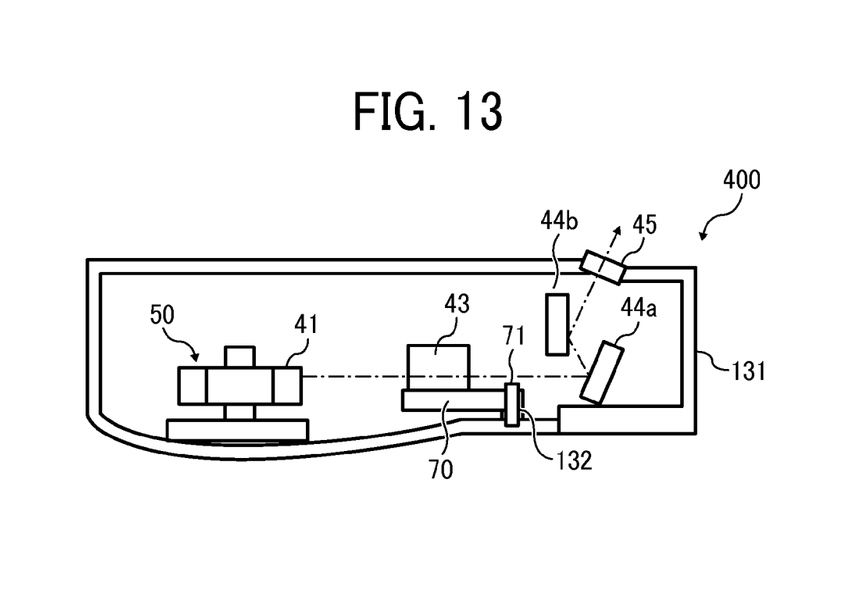
FIG. 13 is a schematic diagram illustrating thermal deformation of the housing employed in the optical scanner of FIG. 11.

With this configuration, as illustrated in FIG. 13, even when the area of the housing 131 near the polygon scanner 50 deforms undesirably due to heat, the housing 70 attached to the housing 131 away from the polygon scanner 50 does not deform, thereby preventing a change in the orientation of the holder 70. FIG. 13 is a schematic diagram illustrating thermal deformation of the housing 131 employed in the optical scanner of FIG. 11. The scan position and the beam spot diameter are prevented from changing, and thus a desirable image is obtained.

According to the illustrative embodiment, the present invention is employed in the image forming apparatus. The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An optical scanner, comprising:
   a housing including a mounting portion;
   a light source configured to project light;
   a polygon mirror mounted on the housing configured to rotate to deflect the light projected from the light source;
   a board configured to hold the polygon mirror, the board being attached to the housing directly;
   a holder surrounding the board and configured to contact only the mounting portion, the holder and the board constituting different element lacking direct contact therebetween; and
   a first optical device mounted on the holder and positioned substantially near the polygon mirror, the holder being attached to the housing via the mounting portion in at least three different locations around the board such that none of the plurality of different locations are positioned between a center of rotation of the polygon mirror and the first optical device,
   wherein a distance L1 between the center of rotation of the polygon mirror and any point on, the first optical device as well as any additional optical device, is shorter than a plurality of distances L2 between the center of rotation of the polygon mirror and each one of the at least three locations at which the holder is attached to the mounting portion.

2. The optical scanner according to claim 1, further comprising:
   multiple additional light sources, configured to form a plurality of light sources; and
   a second optical device, configured to form a pair of optical devices with the first optical device disposed symmetrically about a line perpendicular to a rotation axis of the polygon mirror and configured to deflect and scan the light projected from the plurality of light sources,
   wherein the light projected from at least one of the plurality of light sources is deflected by the polygon mirror onto one of the pair of optical devices, and the light projected from a light source other than the at least one of the plurality of light sources is deflected by the polygon mirror onto the second optical device.

3. The optical scanner according to claim 2, wherein the optical scanner is a counter-scanning type optical scanner.

4. An image forming apparatus comprising the optical scanner according to claim 3.

5. An image forming apparatus, comprising:
   a plurality of latent image bearing members configured to bear a latent image formed thereon; and
   the optical scanner according to claim 2,
   wherein the optical scanner is configured to write the latent images on the surfaces of the plurality of latent image bearing members.

6. The optical scanner according to claim 1, wherein the mounting portion of the housing includes a screw hole and the holder includes a through-hole through which a screw is inserted into the screw hole of the housing to fix the holder to the housing.

7. The optical scanner according to claim 1, wherein the first optical device includes:
   a pre-deflection optical system disposed on a light path between the light source and the polygon mirror and configured to adjust a cross-sectional shape of the light; and
   a scan lens configured to focus the light deflected by the polygon mirror both in a main scanning direction and a sub-scanning direction, and
   wherein the holder is configured to hold the light source and the optical device.

8. The optical scanner according to claim 7, wherein the pre-deflection optical system comprises a collimating lens and a cylindrical lens.

9. The optical scanner according to claim 1, wherein the housing includes a first hole provided opposite the polygon mirror.

10. The optical scanner according to claim 9, further comprising a first dustproof member disposed around the first hole and configured to prevent foreign substance such as dust from getting inside the housing.

11. The optical scanner according to claim 9, wherein the housing includes a second hole provided substantially near the mounting portion of the housing.

12. The optical scanner according to claim 11, further comprising a second dustproof member configured to cover the second hole to prevent foreign substance such as dust from getting inside the housing.

13. The optical scanner according to claim 1, further comprising a damping member attached to the holder and configured to suppress vibration of the holder.

14. The optical scanner according to claim 1, wherein the housing further comprises:
   a rib;
   a substantially transparent member; and
   a cover configured to cover the housing,
   wherein the rib, the substantially transparent member, and the cover constitute an enclosure, and the polygon mirror is sealed within the enclosure.

15. An image forming apparatus, comprising:
   a latent image bearing member configured to bear a latent image formed thereon; and
   the optical scanner according to claim 1,
   wherein the optical scanner is configured to write the latent image on the surface of the image bearing member.

16. The optical scanner according to claim 1, further comprising:
   a board configured to hold the polygon mirror, the board being attached to the housing without contacting the holder.

17. The optical scanner according to claim 16, wherein the holder is configured to surround the board.

18. The optical scanner according to claim 17, wherein the holder includes an opening in which the board is positioned.

19. The optical scanner according to claim 16, wherein a bottom surface of a dustproof member is configured to contact the housing and an upper surface of the dustproof member is configured to contact the board.

20. The optical sensor according to claim 1, wherein a deflection of the housing due to heat generated by the rotation of the polygon mirror results in a first deflection of the first optical device that is less than a second deflection of the first optical device resulting from the deflection if the holder directly contacts the housing and the board and L1 is longer than L2.

* * * * *